United States Patent [19]

Brandt et al.

[11] 3,971,674
[45] July 27, 1976

[54] SELECTIVE BLACK COATING FOR ALUMINUM

[75] Inventors: James L. Brandt, Monroeville; William King, Lower Burrell; James Dean Minford, New Kensington; Clement E. Valchar, Lower Burrell, all of Pa.

[73] Assignee: Aluminum Company of America, Pittsburgh, Pa.

[22] Filed: Mar. 3, 1975

[21] Appl. No.: 554,718

[52] U.S. Cl. .............................. 148/6.27; 427/372; 427/160
[51] Int. Cl.² ........................................ C23F 7/06
[58] Field of Search ..................... 148/6.27; 427/372

[56] References Cited
UNITED STATES PATENTS
1,846,844  2/1932  Clark ................................ 148/6.27

OTHER PUBLICATIONS

Goldowski, Abstract of 619264, Official Gazette, vol. 657, Apr. 29, 1952, p. 1582.

Primary Examiner—Ralph S. Kendall
Attorney, Agent, or Firm—John P. Taylor

[57] ABSTRACT

A selective black coating on aluminum is provided which is characterized by a high absorptivity in the visible and near infrared regions of the spectrum (0.38 to 1.9 microns) and a low emissivity for radiation of longer-(infrared)-wavelength (greater than 6 microns). The black or near black coating is applied by immersing the aluminum in a bath containing soluble borate and silicate salts.

8 Claims, 1 Drawing Figure

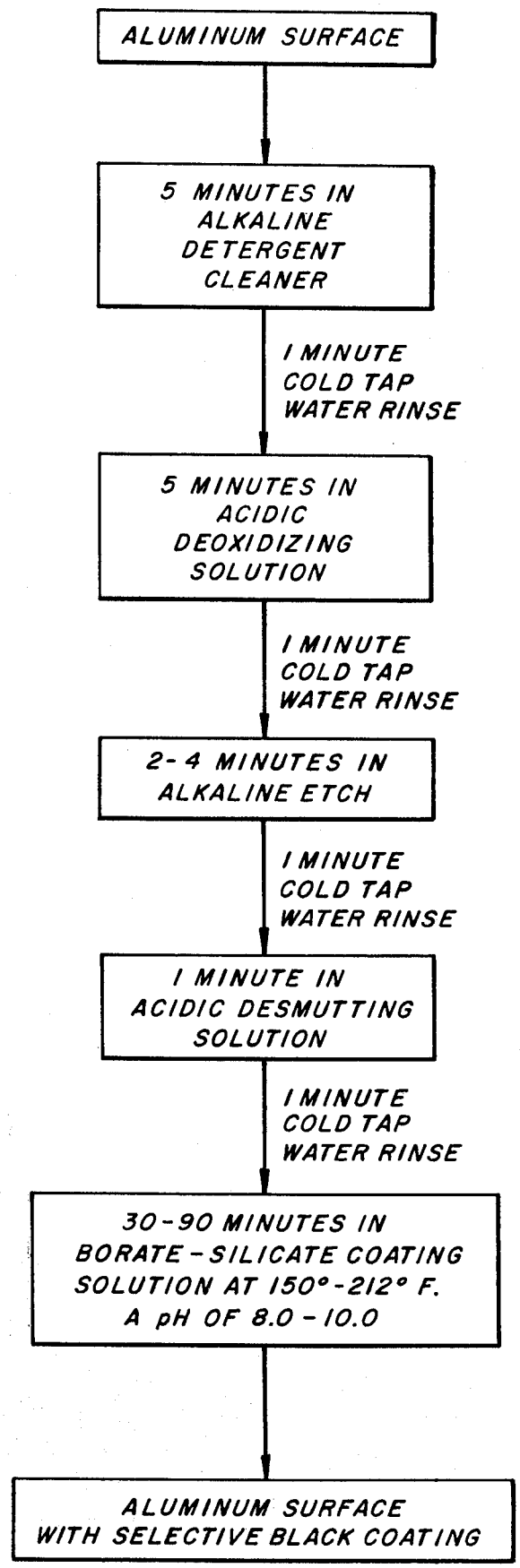

SELECTIVE BLACK COATING FOR ALUMINUM

BACKGROUND OF THE INVENTION

This invention relates to selective coatings for utilization of solar energy. More particularly, this invention relates to a selective black coating for aluminum.

The utilization of solar energy by heat absorption is well known. However, the conversion requires particular materials or systems which are not readily available or which are too expensive to be of practical value. One such system relies on lenses to concentrate the solar rays using parabolic reflectors or the like. In another system which has achieved some limited experimental success, solar collector panels are coated with materials which will absorb the solar radiation. Typically, such materials are metal sheets painted with a flat black paint which will absorb the solar radiation and conduct (via the metal) the heat to appropriate conversion means which may, for example, comprise the heating of water which is then pumped to a utilization point. While it is conventionally known that blackened surfaces are better absorbers of solar energy, it is also characteristic that such surfaces have a high emissivity. This is particularly undesirable from the standpoint of emission of longer wavelength energy such as infrared wavelengths greater than 6 microns which will cause loss of the absorbed energy.

It is therefore desirable that a coating exhibit a high absorption of solar energy, particularly energy in the visible light and near infrared wavelengths (from 0.38 to 1.9 microns) which comprise a majority of the solar spectrum. It should also be characterized by a low emissivity particularly in the area of longer (infrared) rays, i.e. greater than 6 microns.

SUMMARY OF THE INVENTION

In accordance with the invention, a selective black coating on aluminum is provided. The selective black coating is characterized by a high absorptivity of visible and near infrared wavelengths (0.38 to 1.9 microns) and a low emissivity of radiation of infrared wavelength greater than 6 microns. The coating is applied by immersing the aluminum in an aqueous bath containing borate and silicate salts for a sufficient period of time to provide the selective black coating thereon.

DESCRIPTION OF THE DRAWING

The sole drawing of the invention is a flowsheet illustrating the process of obtaining the selective black coating.

DESCRIPTION OF THE INVENTION

In accordance with the invention, the selective black coating is obtained on an aluminum surface by treating the surface with an aqueous solution of borate and silicate salts.

The term "selective black coating" is intended to define a dark coating which may appear to be black or near black and which has an absorptivity in the visible and near infrared wavelengths (i.e. 0.38 to 1.9 microns) of at least 80% and an emissivity in the infrared wavelength range (i.e. greater than 6 microns) of less than 45%.

The aluminum surface which forms the substrate for the selective black coating comprises an aluminum of at least 90% and preferably 95% purity. The substrate may comprise a solid aluminum material, or an aluminum surface on another material having good thermal conducting properties such as steel. In the latter case, the aluminum surface may be attached to the second material by any suitable bonding technique such as cladding, plating, etc. which will provide a suitable thermal transfer path between the aluminum metal and the second material.

The aluminum surface must be free of foreign material including extraneous dirt, soils, or lubricants which may interfere with the formation of the selective black coating. Ordinary stock aluminum, for example, may be prepared for application of the selective black coating by conventional cleaning steps well known to those skilled in the art such as those procedures used in preparing an aluminum surface for anodizing.

Such steps include cleaning the surface with a good alkaline detergent followed by rinsing to remove soils, dirt, and extraneous material. The surface is then treated to remove surface oxides using, for example, a chromic-sulfuric acid solution containing 3.5% by weight chromic acid and 16.5% by weight sulfuric acid or a nitric-phosphoric acid solution containing 3% by weight nitric acid and 82% by weight phosphoric acid with the balance water in each instance.

Following rinsing the surface is then etched in an alkaline solution such as, for example, a 5% by weight sodium hydroxide solution. Following further rinsing, any smut resulting from the etch step is removed using, for example, the chromic-sulfuric acid solution described above or a nitric acid solution containing 35% by weight nitric acid with the balance water. After further rinsing, the surface is ready for application of selective black coating.

To form the selective black coating, the aluminum surface is immersed in an aqueous bath containing soluble borate and silicate salts. The borate salt preferably is sodium tetraborate ($Na_2B_4O_7$) in either the anhydrous or hydrated form and the silicate salt preferably is sodium metasilicate ($Na_2SiO_3 \cdot 9H_2O$). The bath at the operating temperature should have a basic pH in the range of from about 8.0 to about 10.0 and preferably of about 8.6 to 8.7. This can be obtained by periodic addition of fresh solution or, if necessary, by addition of a base such as sodium hydroxide. Such periodic additions are preferably following each treatment of aluminum plates in the solution.

In accordance with the invention, the aluminum should be treated for a period of about 45 minutes. In fresh solutions, the required immersion time may be greater for as long as 75 to 90 minutes. Conversely, after several runs the required immersion time for an aluminum panel could be as little as 30 to 35 minutes. The bath is usually maintained at a temperature of about 150°F to 212°F; preferably the temperature is maintained between about 200°F to 212°F.

Following immersion of the aluminum panel in the solution, the panel is removed and permitted to air dry. The panel may be optionally rinsed either before or after air drying. The resulting coated panel is found to have an absorptivity in the visible and near infrared wavelengths (0.38 to 1.9 microns) of greater than 80%, usually from about 90% to 96%, while at the same time having an emissivity in the infrared wavelength range (greater than 6 microns) of generally less than about 45%, preferably less than 40%, and most preferably less than 20%. For the purpose of this invention, the infrared wavelengths to which the above emissivity figures apply are those wavelengths of from about 6 to 9 microns.

The concentration of the borate salt such as, for example, sodium tetraborate, can be as low as about 200 to 250 parts per million (based on total parts of the solution) and may be as high as about 1000 parts per million. While somewhat higher concentrations may be used-up to the saturation point of the solution, higher amounts have not been found to impart any greater benefit.

The concentration of the silicate salt has been found to be about ⅛ to ½ and optimally about ¼ the concentration of the borate salt. The concentration of the sodium hydroxide or other base may vary from about 0 to 250 parts per million with the base used mainly for pH control.

It has also been found that the treating solution is sensitive to the amount of surface treated per volume of solution. It has been found, for example, that there is a minimum area of surface to be treated per volume of solution expressed as about 0.129 square cm per milliliter or 0.52 sq. ft. per gallon. For reasons which are not entirely understood, a good coating wll not develop if the ratio is much lower than this. If a single panel, for example, is put into the solution, which would result in an area per unit volume of less than 0.129 sq. cm per milliliter, it has been found that the addition of further panels into the solution will achieve the proper coating. Once this area to volume condition is reached, the area of the panels in subsequent runs in the same solution can be less. While it is not understood what creates this phenomena, it is thought that perhaps the solution must become preconditioned with aluminum compounds (such as $Al_2O_3$) before the desired coating is achieved. For example, it has been found that the solution may be preconditioned by the addition of atomized aluminum powder. Before the saturation or equilibrium condition is achieved by such preconditioning, it is thought that the solution may be too reactive, producing a coating that smudges.

To illustrate the process of the invention, a bath was prepared utilizing a tank 3 ft. wide by 14 ft. long and filled to the depth of 5.3 ft. 1665 gallons of deionized water with a resistivity equal to or greater than 1 megohm as determined by conventional measurements were placed in this tank together with 12 lbs. of sodium tetraborate ($Na_2B_4O_7$), 3 lbs. of sodium metasilicate ($Na_2SiO_3 \cdot 9H_2O$) and 3 ½ lbs. of sodium hydroxide. A number of 3 ft. by 8 ft. panels were treated in groups of 9. After each group, the solution level in the tank was maintained by the addition of fresh solution and additional sodium hydroxide, if necessary, to maintain a pH of 8.7. The temperature of the solution was maintained between 200°F and the boiling point. The average time of immersion of the panels in the solution was about 45 minutes. After treatment, the panels were examined and found to have thereon a thin dark coating with an absorptivity in the 0.38 to 1.9 micron wavelength range of about 90% to 96% and an emissivity in the infrared region greater than 6 microns of approximately 20% to 40%.

Electron microprobe analysis on the coated samples revealed the coating to be composed almost entirely of aluminum and oxygen. On one specimen the following were given as percentages of the total coating:

| Al | 70% | Fe | 1.1% |
|---|---|---|---|
| O | 29% | S | .1% |
| Si | 1.5% | Na | .3% |

The second sample was analyzed and found to contain 64% aluminum, 32% oxygen, 1.8% silicon, 1.2% iron, 0.3% sulfur, 0.6% sodium and 0.9% carbon. A specific search for boron revealed none to be present in the coating, at least in the samples analyzed. The high amount of aluminum may be indicative of a measurement of the substrate as well as the coating. Quantitative analysis of a hot water leach of a coated specimen showed there are no soluble materials present in the coating.

While the invention has been described in terms of the preferred embodiments, it should be obvious to those skilled in the art that minor modifications may be made without departing from the spirit of the invention which is to be limited only by the scope of the appended claims.

What is claimed is:

1. A process for applying to an aluminum surface a selective black coating which is characterized by a high absorptivity in the visible and near infrared wavelengths of 0.38 to 1.9 microns and a low emissivity of infrared wavelengths greater than 6 microns comprising immersing the aluminum for at least 30 minutes in a bath capable of forming said selective black coating, containing at least 200 ppm of a soluble borate salt and a soluble silicate salt at a concentration of at least one-eighth the concentration of the borate salt, said bath having a pH in the range of 8 to 10.

2. The process of claim 1 wherein said bath is maintained at a temperature of from about 150°F to about 212°F.

3. The process of claim 2 wherein the ratio of area of aluminum in the bath to bath volume is at least 0.129 $cm^2$ per millileter.

4. A process for applying to an aluminum surface a selective black coating characterized by a high absorptivity in the visible and near infrared wavelengths of 0.38 to 1.9 microns and a low emissivity of 6 to 9 micron wavelength radiation comprising treating a previously cleaned aluminum surface for from about 30 to 90 minutes in a bath containing 200 to 1000 ppm sodium tetraborate and 50 to 250 ppm sodium metasilicate at a temperature of from 150°F to 212°F and a pH of from about 8.0 to 10.0 as measured in the specified temperature range to produce on said aluminum surface the said selective black coating.

5. A process for applying to an aluminum surface a selective black coating which is characterized by a high absorptivity in the visible and near infrared wavelengths of 0.38 to 1.9 microns and a low emissivity of infrared wavelengths greater than 6 microns comprising immersing the aluminum for at least 30 minutes in a bath capable of forming said selective black coating containing at least 200 ppm of a soluble borate salt and a soluble metasilicate salt at a concentration of at least one-eighth the concentration of the borate salt, said bath having a pH in the range of 8 to 10.

6. A process for applying to an aluminum surface a selective black coating which is characterized by a high absorptivity in the visible and near infrared wavelengths of 0.38 to 1.9 microns and low emissivity of infrared wavelengths greater than 6 microns comprising immersing the aluminum for at least 30 minutes in a bath capable of forming said selective black coating containing at least 200 ppm of a soluble tetraborate salt and a soluble salt at a concentration of at least one-eighth the concentration of the tetraborate salt, said bath having a pH in the range of 8 to 10.

7. The process of claim 6 wherein said bath is maintained at a temperature of from about 150°F to about 212°F.

8. The process of claim 7 wherein the ratio of area of aluminum in the bath to bath volume is at least 0.129 $cm^2$ per milliliter.

* * * * *

UNITED STATES PATENT AND TRADEMARK OFFICE
CERTIFICATE OF CORRECTION

PATENT NO. : 3,971,674
DATED : July 27, 1976
INVENTOR(S) : James L. Brandt et al It is certified that error appears in the above—identified patent and that said Letters Patent are hereby corrected as shown below:

Col. 2, line 46  After "are" change "preferably" to --preferable--.

Col. 4, line 38
Claim 3  After "per" change "millileter" to --milliliter--.

Col. 5, line 2
Claim 6  After "soluble" add --silicate--.

Signed and Sealed this

Twelfth Day of October 1976

[SEAL]

Attest:

RUTH C. MASON
Attesting Officer

C. MARSHALL DANN
Commissioner of Patents and Trademarks